United States Patent [19]

Oshino et al.

[11] Patent Number: 4,609,313

[45] Date of Patent: Sep. 2, 1986

[54] BOX HAVING MEANS FOR GUIDING AND LOCKING WHEELED PALLET

[75] Inventors: Masao Oshino; Yasuhiko Nakatani, both of Kakogawa, Japan

[73] Assignees: Kawasaki Jukogyo Kabushiki Kaisha, Kobe; Yashiro Kako Ltd., Hyogo, both of Japan

[21] Appl. No.: 634,137

[22] Filed: Jul. 25, 1984

[30] Foreign Application Priority Data

Aug. 2, 1983 [JP] Japan .............................. 58-120494[U]
Aug. 2, 1983 [JP] Japan .............................. 58-120495[U]

[51] Int. Cl.⁴ .............................................. B60P 3/00
[52] U.S. Cl. ...................................... 410/67; 410/80; 410/84; 16/348; 16/349; 16/361; 296/26; 312/222; 312/311; 312/320
[58] Field of Search .................... 180/68.5; 296/26, 56; 312/222, 311, 320; 410/66, 67, 80, 84; 414/227, 228, 542; 16/348, 349, 360, 361, 370

[56] References Cited

U.S. PATENT DOCUMENTS 2,812,868 11/1957 Crile ..................................... 414/542
3,006,486 10/1961 Cook et al. .......................... 414/542
3,930,552 1/1976 Kunkle et al. ...................... 180/68.5
4,087,140 5/1978 Linstromberg ..................... 312/292

FOREIGN PATENT DOCUMENTS 359368 5/1938 Italy ................................... 180/68.5

Primary Examiner—Robert B. Reeves
Assistant Examiner—David F. Hubbuch
Attorney, Agent, or Firm—Leydig, Voit & Mayer, Ltd.

[57] ABSTRACT

A box for containing a wheeled pallet having articles placed thereon has a lid hingedly connected to a front end of the box to move between an open position and a closed position to open and close an opening formed at the front end of the box. A pair of retractable guide rails are each attached to one of opposing side walls of the box defining the front opening and pivotable about a vertical axis to a position 90 degrees from the front of the box, and to a position beyond 90 degrees to facilitate removal of the pallet from the box, and a mechanism for locking the pallet to the bottom surface of the box is assured to have performed a positive locking operation when the lid is brought to its closed position.

2 Claims, 13 Drawing Figures

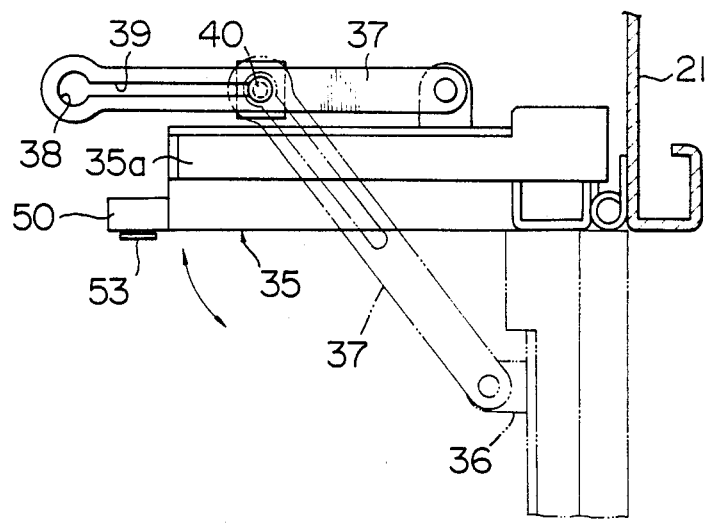
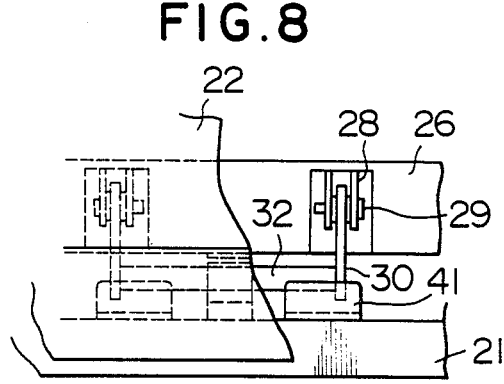
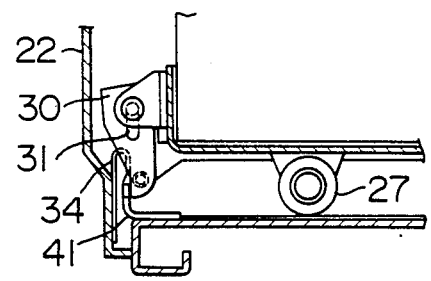

BOX HAVING MEANS FOR GUIDING AND LOCKING WHEELED PALLET

FIELD OF THE INVENTION

This invention relates to a box having means for guiding the movement of a wheeled pallet carrying goods into and out of the box and means for locking the wheeled pallet to the box to keep it from inadvertently moving out of the box.

SUMMMARY OF THE INVENTION

This invention has been developed for the purpose of obviating disadvantages of the prior art. Disadvantages have been found in that the wheeled pallets in such boxes used, for example, on vehicles may inadvertently be left unlocked so that the pallets may be forcibly ejected from the box due to movement of the vehicle. Accordingly, the invention has as its object the provision of a box provided with lock means which is capable of keeping the pallet from being flung out of the box even if the operator forgets to lock the lid and pallet, and pivotally supported guide rail frame means for the wheeled pallet which is capable of being pivoted to a position extending more than 90 degrees from the box to allow a wheeled pallet and load to be removed from the box through the wide open frames and is also capable of being locked in inoperative position inside the box to secure the pallet.

Other and further objects, features and advantages of the invention will appear more fully from the following description, taken in conjunction with the accompanying drawings.

BRIEF DESCRIPTION OF THE DRAWINGS

FIG. 7 is a plan view of the guide rail frame section of the box shown in FIG. 4;

FIG. 8 is a front view, with certain parts being cut out, of the locking means;

FIG. 9 is a side view of the locking means shown in FIG. 8;

FIGS. 1–3 show a box of the prior art to which the invention is directed. The box may be a storage battery box 1 mounted on a vehicle, as shown, which is open at the front and has a lid 2 hingedly supported at its lower side by the box 1 at its open front. A latch 3 formed with a notch at its forward end portion is pivotably connected at its base to an upper outer portion of a left side wall and a right side wall of the box 1, and a metal piece 4 is secured to a left side and a right side of the lid 2, so that as the latch 3 is pivotally moved to bring its notch into engagement with the metal piece 4 on either side of the box 1, the lid 2 can be secured to the box 1 in a manner to close the open front of the box 1. Also, a linkage 5 of known construction is provided to connect the box 1 and lid 2 together so as to keep the lid 2 in the open position. A pallet 6 which is square in shape in a plan view supporting a plurality of storage batteries 7 thereon is contained in the box 1 for free movement into and out of the box 1. The pallet 6 has a handle 8 secured to its front edge, and wheels 9 arranged at front and rear portions of left and right sides thereof to enable the pallet 6 to be smoothly moved into and out of the box 1.

FIG. 3 shows the lid 2 in its open position. A linkage 5 disposed on either side of the box 1 is connected at one end to a side surface of the box 1 and at an opposite end to a side edge of the lid 2 and has a length such that when it is brought to an extended position, as shown in FIG. 3, an inner surface of the lid 2 and a bottom surface of the box 1 are flush with each other. Rails 10 extending from the front to the rear of the lid 2 are laid on its inner surface on the left and right, respectively, to allow the wheels 9 of pallet 6 to move in rolling movement therealong. Cylindrical members 12 each formed with a guide opening 11 substantially in the form of a letter U in a lying position are attached to a front edge of the pallet 6 on the left and right, respectively. A stop bar 13 having a knob 13a for moving the guide opening 11 is inserted in each of the cylindrical members 12 for vertical and rotary movement, and metal receivers 14 each engaged by one of the stop bars 13 when the latter moves to a lower position are located on the left and right, respectively, of a front edge of a bottom plate of the box 1.

Figure 1:
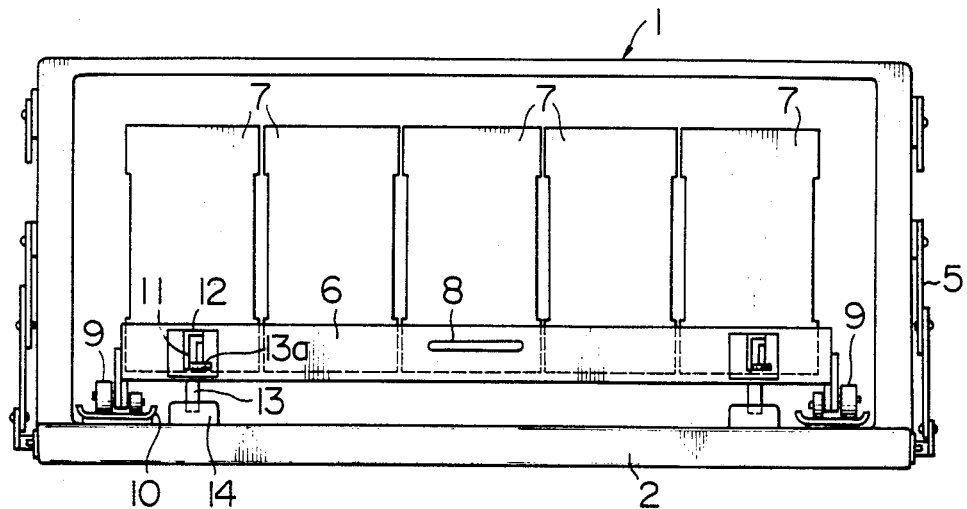
FIG. 1 is a front view of a box of the prior art with a lid being in an open position.

In the box of the aforesaid construction, when the storage batteries 7 in the box 1 are to be withdrawn, the lid 2 is brought to its open position and the stop bars 13 are moved upwardly by the operator gripping the knobs 13a to bring the stop bars 13 out of engagement with the metal receivers 14. Then, the operator grips the handle 8 and moves the pallet 6 out of the box 1 along the rails 10 on the inner surface of the lid 2 which is in its open position, so that the storage batteries 7 can be withdrawn from the box 1 as the pallet 6 is guided in its movement by the rails 10. When it is desired to insert the storage batteries 7 in the box, the operator has only to perform the aforesaid operation in reverse.

The box of the construction and operation described hereinabove has the following disadvantages. To avoid the pallet 6 inadvertent sliding out of the box 1, it is essential that the stop bars 13 be fully moved downwardly into engagement with the metal receivers 14 at the inner sides thereof. If the operator forgets to bring the stop bars 13 into engagement with the respective metal receivers 14 or if the stop bars 13 were disposed on the outer sides of the metal receivers 14, the pallet 6 would inadvertently slide out of the box 1 when the lid 2 is brought to its open position or the force of an impact which might be given by the pallet 6 to the lid 2 while the vehicle is travelling would damage the lid 2 and fling the pallet 6 out of the box 1. Also, when the pallet 6 is moved out of the box 1, a load of high magnitude would be applied to the lid 2 and the linkage for supporting the lid 2, so that it would be necessary to give high strength to these structures in design phase.

DETAILED DESCRIPTION OF THE PREFERRED EMBODIMENTS

Preferred embodiments of the invention will now be described by referring to the accompanying drawings.

Figure 4:
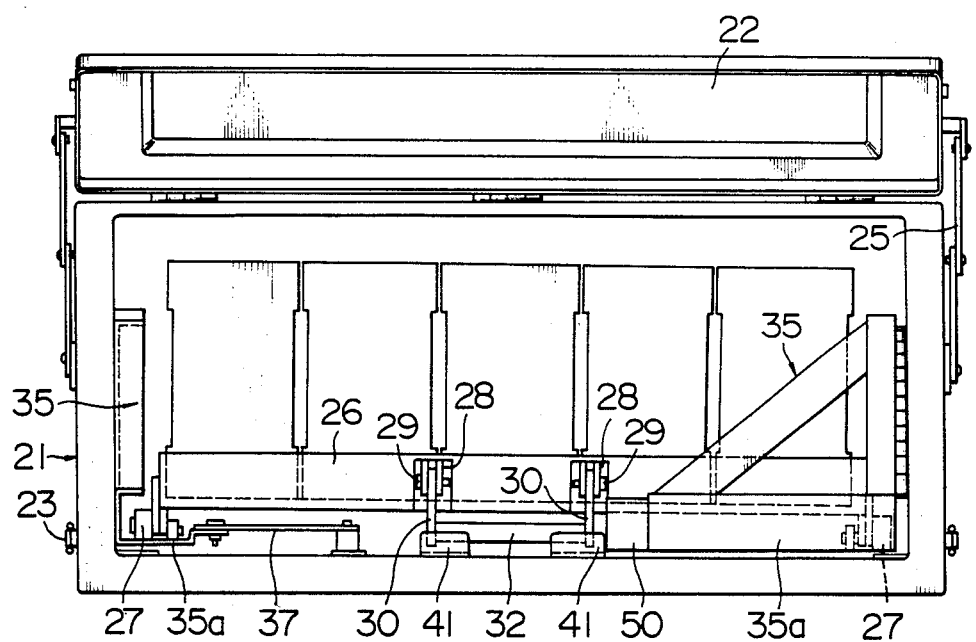
FIG. 4 is a front view of the box comprising one embodiment of the invention, showing the lid in an open position.
Figure 5:
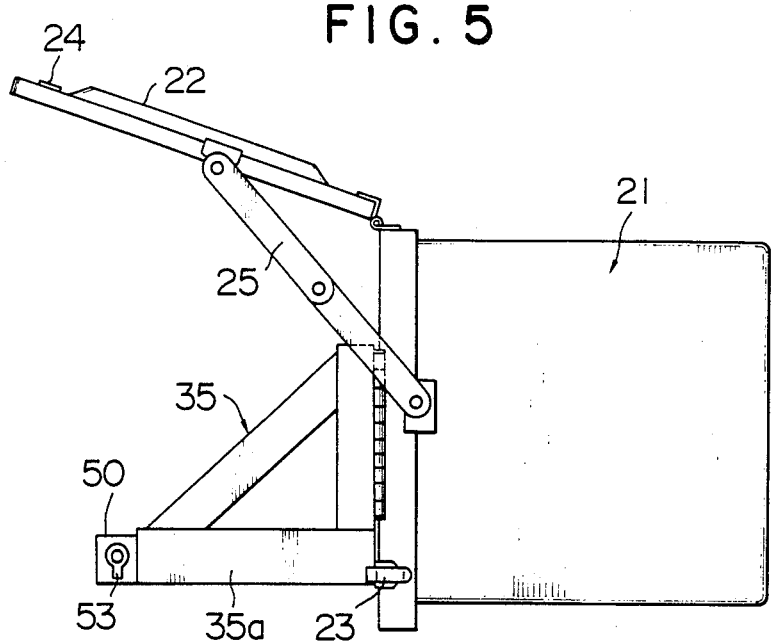
FIG. 5 is a side view of the box shown in FIG. 4.
Figure 6:
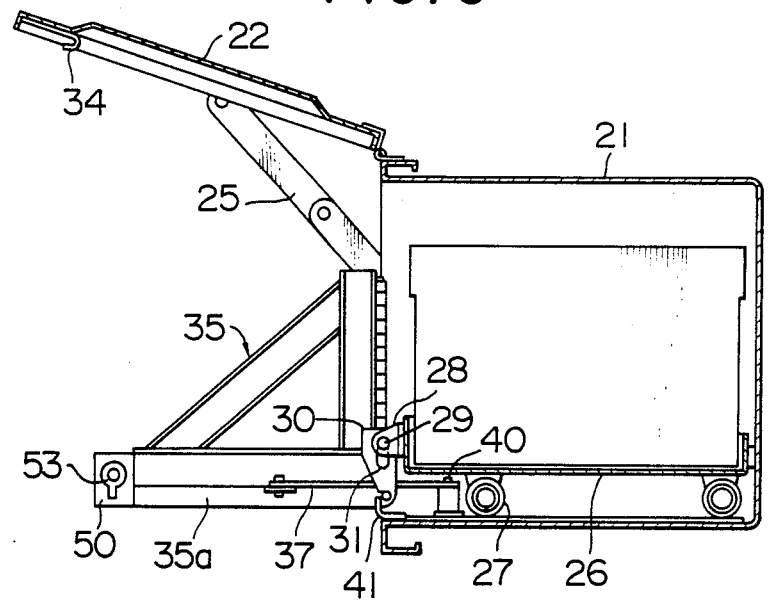
FIG. 6 is a vertical sectional side view of the box shown in FIG. 4, showing the lid in an open position.

Referring to FIGS. 4–6, a box 21 formed with an opening at the front has a lid 22 hingedly connected at its upper end to an upper side of the opening of the box 21. Latches 23 are attached to outer front ends of left and right side walls of the box 21 which are brought into and out of engagement with metal pieces 24 on the lid 22 to releasably lock the lid 22 in a closed position in which the lid 22 closes the front opening of the box 21. Linkages 25 connect the box 21 to the lid 22 and are operative to maintain the opening position of the box 21.

Figure 2:
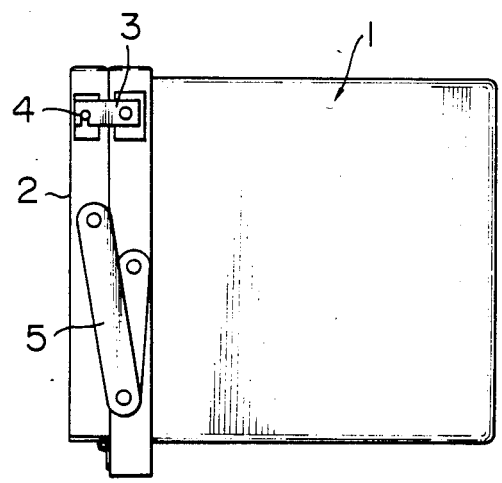
FIG. 2 is a side view of the box shown in FIG. 1.
Figure 3:
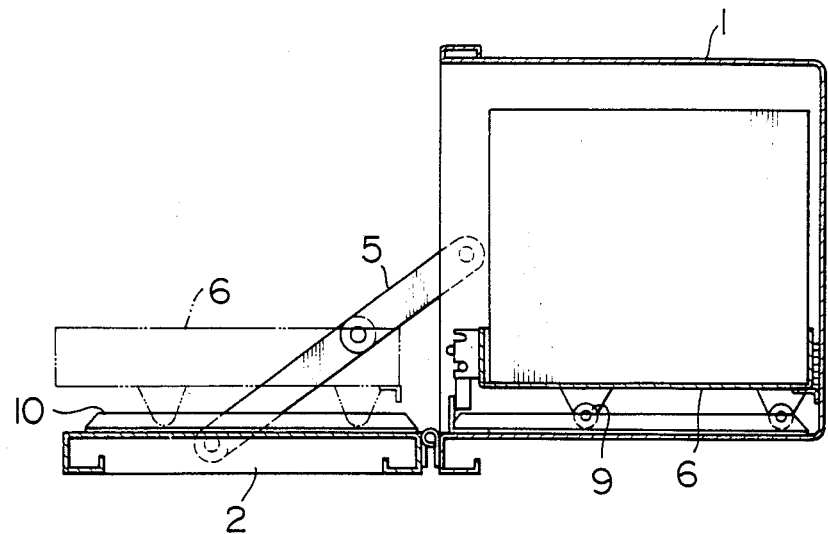
FIG. 3 is a vertical sectional side view of the box shown in FIG. 1, showing the lid in an open position.

The box 21 contains a pallet 26 of the same construction as the pallet 6 of the prior art shown in FIGS. 1–3 which is equipped with wheels 27 at the front and rear on opposite sides of a bottom plate of the pallet 26.

Guide rail frames 35 are supported on inner surfaces of left and right side walls of the box 21 near the front opening thereof each for pivotal movement about a vertical axis. When the lid 22 is moved to its closed position in which it closes the front opening of the box 21, the guide rail frames 35 are moved along an inner surface of the lid 22 to inoperative positions in the box 21. When the lid 21 is moved to its open position to open the front opening of the box 21 and withdraw the pallet 26 from the box 21, the guide rail frames 35 are pivotally moved outwardly from their inoperative positions in the box 21 to operative positions out of the box 21 through 90 degrees, and rails 35a constituting horizontal sides of the guide rail frames 35 guide the pallet 26 in its movement into and out of the box 21. Links 37 are provided to positively secure the guide rail frames 35 between their inoperative and their operative positions outside the box 21.

Referring to FIG. 7, each of the links 37 is pivotally connected at one end to a projection 36 fixed at an inner surface of a rail 35a and has at an opposite end portion an increased diameter aperture 38 and a guide slot 39 contiguous with the increased diameter aperture 38 and extending therefrom for receiving therein a pin 40 secured to a front end portion of a bottom plate of the box 21. The pin 40 includes a head of a diameter slightly smaller than the diameter of the increased diameter aperture 38, and a shank of a diameter slightly smaller than the width of the guide slot 39. In normal operation, the pin 40 is never brought out of engagement in the aperture 38 and slot 39 of the link 37, but the link 37 can be brought out of engagement with the pin 40 by slightly lifting one end of the link 37 after placing the increased diameter aperture 38 in the position of the pin 40, to thereby allow the guide rail frame 35 to move pivotally further outwardly beyond the range of 90 degrees.

Moreover, lock means is provided to the pallet 26 and each of the guide rail frames 35 for avoiding its inadvertent movement out of the box 21.

Figure 10:
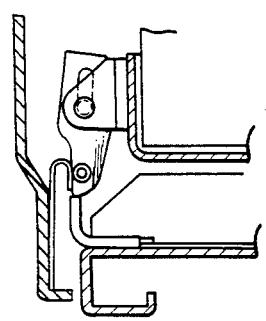
FIGS. 10 and 11 are side views of the locking means, shown in malfunctioning condition.
Figure 11:
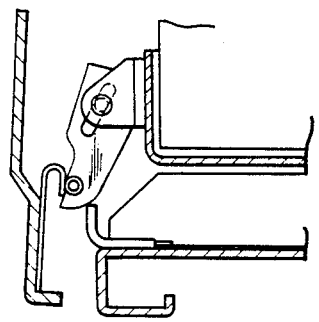

Referring to FIGS. 4, 8 and 9, two clasps 30 connected together by a horizontally extending handle 32 are each mounted through a mounting fixture 28 and a pin 29 to a front surface of the pallet 26 for pivotal movement about a horizontal axis. As shown in FIG. 9, each of the clasps 30 is formed with a slot 31 extending lengthwise of a body of the clasp 30 for receiving the pin 29 and has contacting surfaces at the front and rear disposed parallel to the length of the body of the clasp 30 which are brought into engagement with a vertical contacting surface of a stopper 41 installed on the bottom surface of the box 21 and a vertical contacting surface of the mounting fixture 28, respectively, when the pallet 26 is locked. When the clasp 30 is oriented in a vertical direction as shown in FIG. 9, the body of the clasp 30 can move vertically in sliding movement along the slot 31. Thus, if the handle 32 is gripped by the operator and the clasps 30 are moved upwardly, it is possible to bring the clasps 30 out of engagement with the stoppers 41, and then it is possible to withdraw the pallet 26 from the box 21 if the handle 32 is pulled forwardly toward the operator. As shown in FIGS. 6 and 9, metal pushers 34 are attached to an inner surface of a lower end of the lid 22 in positions corresponding to those of the clasps 30, so that when the lid 22 is brought to its closed position to close the front opening of the box 21, the metal pushers 34 push the respective clasps 30 to move the latter in pivotal movement. When the clasps 30 have positively been brought to locking positions in which they are brought into engagement with the stoppers 41, before the lid 22 is brought to its closed position, the metal pushers 34 have no particular function. However, when the body of each of the clasps 30 is in engagement at its lower end with an upper surface of the associated stopper 41 as shown in FIG. 10, the metal pushers 34 will further rotate the clasps 30 to its locking position. Also, when the body of each clasp 30 is inadvertently moved downwardly in such a manner that its lower end is disposed in front of the associated stopper 41 as shown in FIG. 11, it is impossible to move the lid 22 to its closed position, thereby informing the operator that the locking of the pallet 26 is not performed as it should be.

Figure 12:
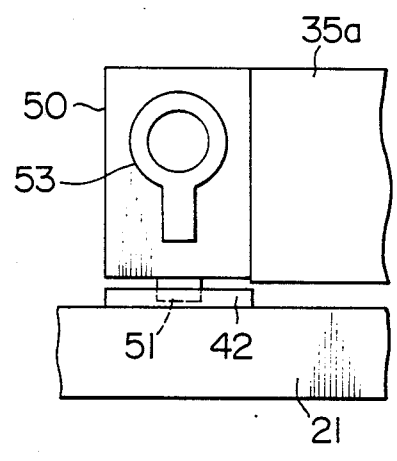
FIG. 12 is a front view of the claw section of the guide rail frame.
Figure 13:
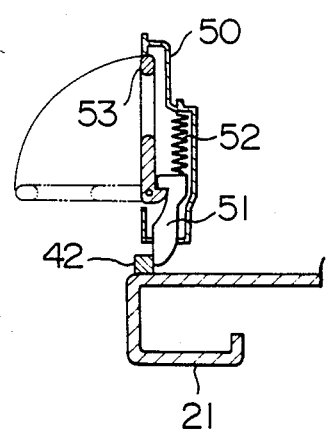
FIG. 13 is a vertical sectional side view of the claw section shown in FIG. 12.

As shown in FIGS. 4, 12 and 13, a casing 50 is attached to a forward end of each of the guide rail frames 35 to contain therein a claw 51 urged downwardly by the biasing force of a spring 52 for vertical sliding movement. The claw 51 can be moved upwardly in sliding movement if a knob 53 pivotally attached to the casing 50 is moved forwardly as shown in phantom lines in FIG. 13. A projection 42 is located at the front end portion of the upper surface of the bottom plate of the box 21 in a position corresponding to that of each of the claws 51, so that the projection 42 is brought into engagement with the associated claw 51 to lock the respective guide rail frame 35 in place against pivotal movement. As shown in FIG. 13, a rear surface of a front end portion of each of the claws 51 is tilting, so that when the guide rail frames 35 are moved from their operative positions outside the box 21 to their inoperative positions inside the box 21, each claw 51 is pushed upwardly by the associated projection 42 against the biasing force of the spring 52 into engagement with the respective projection 42 automatically. When it is desired to bring each of the claws 51 out of engagement with the associated projection 42 to unlock the guide rail frames 35, the operator has only to move the knobs 53 forwardly to lying positions as described hereinabove.

From the foregoing description, it will be appreciated that in the box of the aforesaid construction according to the invention, when the links 37 are fully extended in their strokes, the guide rail frames 35 can be moved to their operative positions in which they are disposed at right angles to the front edge of the box 21, to enable the pallet 26 to be smoothly withdrawn. By bringing one end of each of the links 37 out of engagement with the box 21, it is possible to move the guide rail frames 35 through an angle over 90 degrees in pivotal movement to allow the pallet 26 to be taken out from the box 21 together with the articles placed thereon without interference from the guide rails and without the pallet having to be moved on the wheels to the ends of the rails. When articles are placed on the pallet 26 and the pallet 26 is moved into the box 21 before the guide rail frames 35 are folded and the lid 22 is brought to its closed position in which it closes the front opening of the box 21, the clasps 30 attached to the pallet 26 and the claws 51 located on the guide rail frames 35 are positively brought into locking engagement with the stoppers 31 and projections 42 on the bottom plate of the box 21, respectively. Thus, a dual protection is provided against the risks of the pallet 26 inadvertently moving out of the box 21 when the lid 22 is brought to its open position, damaging the articles placed on the pallet 26 and injuring the operator.

Having described a specific embodiment of our bearing, it is believed obvious that modification and variation of our invention is possible in light of the above teachings.

What is claimed is:

1. A box formed with an opening at its front end to allow a wheeled pallet having articles placed thereon to be moved horizontally therethrough to be inserted into and withdrawn from the interior of the box, and having a lid hingedly connected to the front end of the box to move between an open position and a closed position to open and close the opening of the box comprising:
   a pair of retractable guide rails for guiding said wheeled pallet in its movement into and out of the box, said pair of retractable guide rails each being supported at a respective one of two side walls of the box defining said opening for pivotal movement about a vertical axis;
   link means connecting said pair of retractable guide rails and said box together, said link means being capable of moving said pair of retractable guide rails between inoperative positions inside the box in which they are parallel to the lid disposed in its closed position and operative positions outside the box in which they are at 90 degrees to the front end of the box and locking them in the 90 degree range from said inoperative to said operative positions, said link means enabling the pair of retractable guide rails to be unlocked and further moved pivotally to positions beyond the range of 90 degrees to allow the pallet to be removed from the box, said guide rails being supported for pivotal movement to positions beyond the range of 90 degrees.

2. A box formed with an opening at its front end to allow a wheeled pallet having articles placed thereon to be moved horizontally therethrough to be inserted into and withdrawn from the interior of the box and having a lid hingedly connected to the front end of the box to move between an open position and a closed position to open and close the opening of the box comprising:
   a pair of clasps attached to a front surface of the pallet, each including a body pivotable about an axis parallel to said front surface and slidable along the length of the clasp;
   a pair of stoppers attached to a bottom surface of the box, said pair of stoppers being located in positions corresponding to the positions of said pair of clasps and each having a vertical contacting surface facing the box; and
   metal pushers attached to an inner surface of the lid in positions corresponding to the positions of said clasps to push said clasps;
   said clasps each having two contacting surfaces extending parallel to the length of the body of the clasp, one of said contacting surfaces facing the box and the other contacting surface facing in a direction opposite the box, and said contacting surface of each said clasp facing the direction opposite the box being movable into and out of engagement with the vertical contacting surface of the associated stopper while said contacting surface of each said clasp facing the box being movable into and out of engagement with a vertical contacting surface located on the front surface of the pallet, whereby when the contacting surfaces on the clasps are in engagement with the contacting surfaces on the stoppers and the pallet, the pallet is restrained from inadvertently moving out of the box.

* * * * *